United States Patent [19]
Heierli

[11] 3,747,849

[45] July 24, 1973

[54] CONTROL DEVICE FOR A HEATING INSTALLATION

[76] Inventor: Werner Heierli, Chemin de Gravenau 1, 1580 Avenches, Switzerland

[22] Filed: May 1, 1972

[21] Appl. No.: 249,409

[30] Foreign Application Priority Data
May 14, 1971  Switzerland........................ 7141/71

[52] U.S. Cl.................................. 236/91, 318/674
[51] Int. Cl. .......................................... G05b 11/32
[58] Field of Search...................... 318/674; 236/91, 236/78

[56] References Cited
UNITED STATES PATENTS
3,216,662  11/1965  Gerzon ............................ 236/91 X
3,418,547  12/1968  Dudler............................. 318/685 X

*Primary Examiner*—William E. Wayner
*Attorney*—Werner W. Kleeman

[57] ABSTRACT

A control device for a heating installation incorporating mechanism for influencing the temperature of a heat carrier, the control device possessing temperature-dependent resistors for sensing the external temperature, the room temperature and the temperature of the heat carrier of a room or area to be heated. The invention contemplates the provision of at least one voltage divider embodying an adjustable resistor and the temperature-dependent resistors which are connected in parallel to one another. Two charging capacitors each having associated therewith a charging resistor are also provided, one charging capacitor being electrically coupled with that partial voltage of the voltage divider which increases during increase of at least one of the aforementioned temperatures, and the other charging capacitor being electrically coupled with that partial voltage of the voltage divider which increases during decrease of at least one of the aforementioned temperatures. There is also associated with each charging capacitor a respective pulse generating device for producing a pulse when the charging voltage has reached a certain value and at which time the charging capacitor simultaneously discharges, this pulse being employed for controlling the aforesaid mechanism for influencing the temperature of the heat carrier.

6 Claims, 4 Drawing Figures

3,747,849

3,747,849

CONTROL DEVICE FOR A HEATING INSTALLATION

BACKGROUND OF THE INVENTION

The present invention relates to a new and improved control device for a heating installation incorporating a mechanism for influencing the temperature of a heat carrier, the control device possessing temperature-dependent resistors for sensing or determining the external temperature, the room temperature and the temperature of the heat carrier which is delivered to a room or area intended to be heated.

The piror art is already acquainted with such type control devices which, as a function of the external temperature and the room temperature, vary the temperature of the so-called preliminary infed heating medium, that is to say, the temperature of hot water delivered to the room or area to be heated. The aforementioned temperatures are monitored by thermostats which upon reaching an upper or lower threshold value close or open, respectively, current circuits and thus influence heating of the room. Depending upon how far from one another these threshold values are located there is afforded a relatively coarse thermal-regulation which can become noticeably uncomfortable in that the room temperature can considerably fluctuate. In particular, if there is a rapid increase of the outside temperature these can arise overheating of the room in question and during a rapid drop of the outside temperature underheating of the room to be heated.

SUMMARY OF THE INVENTION

Hence, from what has been stated above it should be apparent that this particular field of technology is still in need of control devices for heating installations which are not associated with the aforementioned drawbacks and limitations of the state-of-the-art proposals. Thus, it is a primary object of the present invention to provide an improved control device of the character mentioned which effectively and reliably fulfills the existing need in the art and is not associated with the aforementioned drawbacks and limitations of the prior art proposals.

Another and more specific object of the present invention relates to an improved construction of control device which is capable of controlling the infeed of heat or thermal energy to a room to be heated as a function of the rapidity with which the temperature fluctuations occur so as to avoid the previously discussed drawbacks.

Yet a further significant object of the present invention relates to a new and improved construction of control device for heating installations which is relatively simple in construction and design, economical to manufacture, highly reliable in operation, and in particular is extremely sensitive in rapid fashion to temperature fluctuations so that a much more positive control of the room to be heated occurs.

Now in order to implement these and still further objects of the invention, which will become more readily apparent as the description proceeds, the inventive control device is manifested by the features that there is provided at least one voltage divider embodying an adjustable resistor and parallely connected temperature-dependent resistors. There are also provided two charging capacitors each associated with a charging resistor. One of the charging capacitors is electrically coupled with that partial voltage of the voltage divider which increases during increase of at least one of the aforementioned temperatures. The other charging capacitor is electrically coupled with that partial voltage of the voltage divider which increases during decrease of at least one of the aforementioned temperatures. Further, each charging capacitor has associated therewith a respective device for producing a pulse when the charging voltage has reached a certain value and the charging capacitor simultaneously discharges. The generated pulses are used for controlling the mechanism serving to influence the temperatures of the heat carrier.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
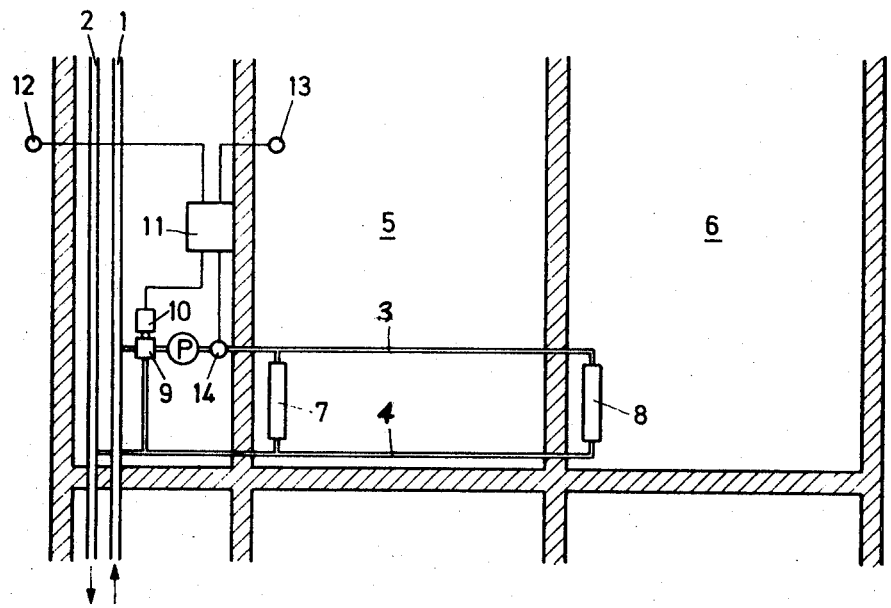
FIG. 1 is a schematic cross-sectional view through a building, the room heating of which is to be regulated and equipped with the control device of this invention.

Describing now the drawings, and considering initially the showing of FIG. 1 there is illustrated therein a cross-sectional view of a storey of a building. Operatively associated with such building storey is a hot water-flow preliminary riser conduit or pipe 1 and a return riser conduit or pipe 2 for the flow of cool water. Branching-off from the preliminary riser flow conduit 1 into the area to be controlled, for instance assumed to be an apartment by way of example, is a preliminary inflow conduit 3. For the sake of simplicity in the showing of the drawing only two rooms or areas 5 and 6 have been shown, although it should be quite apparent that the principles of the invention are applicable to any number of rooms. Further, the term "room" as employed in the context of this application is not to be construed in a limiting sense as solely applicable to a region bounded by walls but encompasses any area or region intended to be thermally controlled. Further, a return flow conduit 4 leads back to the return flow riser conduit 2. Suitable heating bodies or elements 7 and 8, radiators for instance, are connected in flow relationship to both the preliminary inflow conduit 3 and the return flow conduit 4.

At the initial region or start of the inflow conduit 3 there is arranged a mixing valve 9 through the agency of which the preliminary inflow conduit 3 receives a mixture of hot water from the preliminary riser conduit 1 and colder water from the return flow riser conduit 2. With the aid of a servomotor 10 it is possible to selectively alter the mixing ratio of such hot and cooler water streams by means of the mixing valve 9.

A control device 11 for controlling the servomotor 10 is arranged at a wall bounding the room 5 in the neighborhood of the servomotor 10. Operatively associated with such control device 11 is a temperature feeler or sensor 12 mounted externally of the building for determining the outside or ambient temperature, a temperature feeler or sensor 13 arranged in the room in question, here the room 5, for determining the room temperature, and finally a temperature feeler or sensor 14 arranged at the start of the preliminary inflow conduit 3 for determining the temperature of the preliminary infed water delivered to the room or rooms to be heated.

Figure 2:
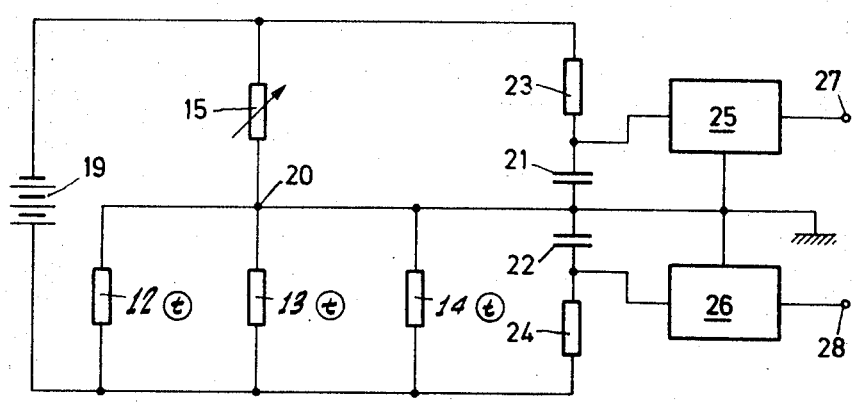
FIG. 2 is a circuit diagram of a constructional form of control device for regulating the room heating.

With this general arrangement in mind and turning now to the showing of FIG. 2 there is illustrated therein a principle circuit diagram of the control device 11. This control device 11 embodies a voltage divider composed of an adjustable resistor 15 and three NTC-resistors 12, 13 and 14 (commonly known in the art as negative temperature coefficient resistors) which are connected in parallel with one another. Such voltage divider is electrically coupled with a suitable voltage source 19, here shown by way of example to constitute a battery. The junction or terminal point 20 of the voltage divider is connected with ground as illustrated. A respective terminal of each of two charging capacitors 21 and 22 is electrically coupled with this junction point 20. The other terminals of such charging capacitors 21 and 22 are connected via charging resistors 23 and 24 respectively with the ends or terminals of the voltage divider. As a result, the charging capacitor 21 can be charged via the charging resistor 23 by means of the voltage drop appearing across the adjustable resistor 15 while the charging capacitor 22 can be charged via the charging resistor 24 by means of the voltage drop appearing across the parallel circuit of the NTC-resistors 12, 13 and 14.

Now connected in parallel with each of the charging capacitors 21 and 22 is a respective pulse generating device 25 and 26 for generating a pulse at its output 27 and 28 respectively. Each time that the associated charging capacitor is charged to a certain voltage which is smaller than one-half of the voltage furnished by the voltage source 19 this pulse generating device 25 or 26 delivers a pulse of constant duration and constant amplitude. By means of this pulse it is possible, for instance, to control the servomotor 10 of FIG. 1, and specifically wherein the pulses delivered by the pulse generating device 25 bring about brief rotation of the servomotor in one rotational direction, which in turn produces the result that the mixing valve 9 of the preliminary inflow conduit 3 has delivered thereto less hot water from the preliminary riser conduit 1 and a greater amount of cooler water from the return flow riser conduit 2. On the other hand a pulse appearing at the output 28 of the pulse generating device 26 produces the opposite result.

As is well known in the electronics art the NTC-resistors 12, 13 and 14 are resistors whose resistance decreases with increasing temperature. The NTC-resistor 12 of FIG. 2 corresponds to the temperature feeler 12 of FIG. 1 for sensing the outside or ambient emperature, the NTC-resistor 13 of FIG. 2 corresponds to the temperature feeler 13 of FIG. 1 for sensing the room temperature and the NTC-resistor 14 of FIG. 2 corresponds to the temperature feeler 14 of FIG. 1 for sensing the temperature of the water at the start of the preliminary inflow conduit 3.

The mode of operation of the control device illustrated in FIG. 2 will not be considered. If for an assumed outside or ambient temperature there is to be delivered to the room to be heated as much heat as such room loses heat, then, the voltage divider should be designed such that the voltage drop across the adjustable resistor 15 and across the parallel connected NTC-resistors 12, 13 and 14 are of the same magnitude. In order to fulfill this condition the resistor 15 is adjustable. Both of the charging capacitors 21 and 22 are practically of the same size and the charging resistors 23 and 24 possess the same resistance values, so that under assumed conditions both of the charging capacitors do not of necessity simultaneously charge but in the same rythm and owing to the associated pulse generating devices 25 and 26 discharge upon generating a pulse. By means of a pulse from one of the pulse generating devices the mixing valve 9 is only adjusted slightly so that thereafter by means of a pulse from the other pulse generating device it will be set back in the opposite direction. In this way in the event of unaltered conditions at the room to be heated and viewed as an average over a longer time-span there is delivered an essentially constant quantity of heat per unit of time.

If the outside temperature drops for instance, then, the resistance value of the NTC-resistor 12 increases so that the voltage appearing across the parallel circuit of the three NTC-resistors increases and the voltage appearing across the adjustable resistor 15 decreases. This causes an increased rythmn for the charging and discharging of the charging capacitor 22 and the rythmn with which the charging capacitor 21 is charged and discharged is slowed down. As a result there appear more pulses per unit of time at the output 28 of the pulse generating device 26 than at the output 27 of the pulse generating device 25. This in turn causes adjustment of the mixing valve 9 in the positive direction, that is to say, warmer water is delivered via the preliminary infeed conduit 3 to the room to be heated for the purpose of compensating for the larger thermal losses brought about by the drop in the outside temperature. The resistance value of the NTC-resistor 14 decreases owing to heating-up of the preliminary inflowing water and thus begins to oppose the increase in the resistance of the NTC-resistor 12 before there can arise an overheating of the room to be heated. The quicker that the outside temperature drops that much quicker will there be delivered additional heat to the room.

If, for instance, in the room to be heated a window is opened, then, the room temperature drops and the resistance value of the NTC-resistor 13 increases. Just as was the case explained above with regard to the NTC-resistor 12, this causes a compensation of the larger thermal losses brought about through opening of the window.

If, for instance, the water temperature at the start of the preliminary inflow conduit 3 drops because of a decrease in the temperature of the water in the preliminary riser conduit 1, then, as a result thereof the resistance value of the NTC-resistor 14 increases. As a result the mixing valve 9 will be adjusted in positive direction, whereby more hot preliminary inflow water will arrive from the preliminary inflow riser conduit 1 and less cooler water will flow out of the return flow conduit 2 into the preliminary inflow conduit 1, in order to deliver the same quantity of heat to the room to be heated, since the thermal losses of the room have remained constant.

The above-described three individual situations can also of course occur simultaneously, whereby simultaneously arising opposed effects, for instance increase in the outside temperature and decrease of the temperature of the preliminary water in the preliminary riser conduit 1, will mutually compensate one another without influencing the rythmn of the generation of pulses. Changes occurring in the same sense, for instance a decrease in the outside temperature and opening a window will produce a pronounced change in the rythmn of the generation of pulses.

Instead of using NTC-resistors it would also be possible to use resistors having a sufficiently large positive temperature coefficient. However, in this regard it should be observed that the outputs 27 and 28 of the pulse generating devices 25 and 26 must be appropriately connected to the servomotor 10 since their effect is now opposite.

Figure 3:
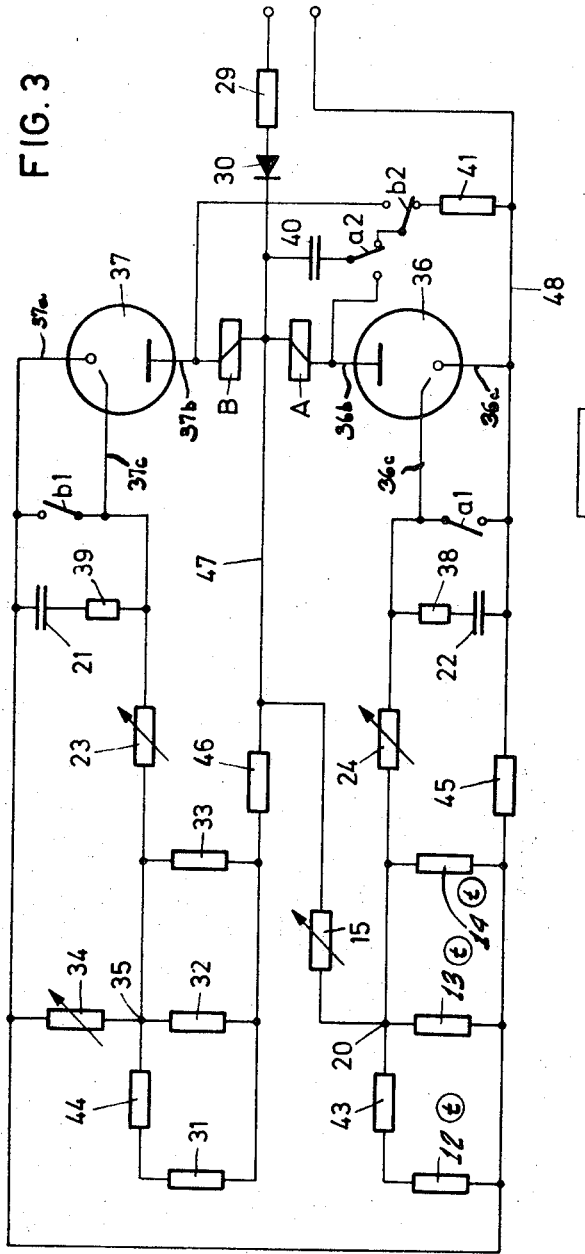
FIG. 3 is a circuit diagram of a further embodiment of inventive control device.

In FIG. 3 there is illustrated a circuit diagram of a further embodiment of control device 11 of the type shown in the arrangement of FIG. 1. The adjustable resistor 15, the NTC-resistors 12, 13 and 14 and the charging resistor 24 and the charging capacitor 22 correspond to the components of the embodiment of FIG. 2 and have been designated by the same reference characters. In this case there is utilized as the voltage source a diode 30 connected to an alternating-current power network via a protective resistor 29. The positive terminal of this voltage source is connected with a supply conductor 47 and the negative terminal with a ground conductor 48. A second voltage divider, similar to the first constructed voltage divider, and which essentially contains three further NTC-resistors 31, 32 and 33 and a further adjustable resistor 34, and containing the junction or terminal point 35, is connected with respect to the first voltage divider in exactly the opposite manner with the supply conductor 47 and the ground conductor 48. The charging capacitor 21 is electrically coupled via the charging resistor 23 with the junction or terminal point 35 of the second voltage divider and can be charged by means of the voltage drop appearing across the adjustable resistor 34.

This embodiment of invention incorporates two voltage dividers so that both charging capacitors 21 and 22 can be charged in positive direction with regard to the ground conductor 48, so that practically identical devices can be employed for the generation of the pulses. The NTC-resistor 31 is applied at the same location as the NTC-resistor 12, the NTC-resistor 32 is applied at the same location as the NTC-resistor 13 and finally the NTC-resistor 33 is applied at the same location as the NTC-resistor 14. In this manner both voltage dividers are subjected to the same conditions.

Each device illustrated by a box or block in FIG. 2 and serving for the generation of pulses here will be understood to possess a cold cathode tube 36 and 37 respectively, the respective cathode 36a and 37a of which is connected with the ground conductor 48 and the respective anode 36b and 37b of which is connected via a respective relay A and B with the supply conductor 47. The respective control electrode 36c and 37c of each cold cathode tube 36 and 37 is electrically coupled via a respective protective resistor 38 and 39 with the associated charging capacitor 22 and 21 respectively. The supply voltage, delivered by the diode 30, is chosen such that the code cathode tubes 36 and 37 only first then ignite when a certain voltage appears at their control electrodes, that is when the charging capacitors have charged to a certain voltage.

After ignition of the cold cathode tube 36 the relay A is energized. A work contact al of the relay A ensures that the charging capacitor 22 will discharge across the protective resistor 45. This protective resistor limits the discharge current and therefore protects the work contact al. After ignition of the cold cathode tube 36 such remains conductive even if the charging capacitor 22 has completely discharged. The function of the extinguishing capacitor 40 is to briefly reduce the operating voltage applied to the anode of the cold cathode tubes in such a manner that the cold cathode tube extinguishes when the relay A has been energized. In the rest state of both relays A and B the extinguishing capacitor 40 is charged to the full supply voltage since it is connected on the one hand with the supply conductor 47 and on the other hand via a switching contact a2 of the relay A, a switching contact b2 of the relay B and a limiting resistor 41 with the ground conductor 48. Owing to energization of the relay A the switching contact a2 switches-over so that the extinguishing capacitor 40 is connected to the anode of the cold cathode tube 36. As a result the voltage between the anode and the cathode of the cold cathode tube 36 briefly drops to zero and the cold cathode tube extinguishes. The extinguishing capacitor 40 discharges across the relay A so that de-energization of this relay is delayed. As explained above the extinguishing capacitor 40 fulfills two functions: it ensures that the cold cathode tube extinguishes and that the relay is de-energized with a certain time-delay.

After de-energization of the relay A the work contact al opens so that the charging capacitor 22 can again charge up via the charging resistor 24. The switch-over contact a2 switches back so that the extinguishing capacitor 40 can charge to the supply voltage via the limiting resistor 41. When the voltage at the charging capacitor 22 has reached the predetermined value then the cold cathode tube 36 again ignites and the above-described operations repeat.

The cold cathode tube 37, the relay B, the charging capacitor 21 and the extinguishing capacitor 40 cooperate with one another in a manner analogous to that considered above. In this regard it is to be observed that the extinguishing capacitor 40 serves for extinguishing both cold cathode tubes 36 and 37 and for the time-delay de-energization of both relays A and B. The pulses, the duration of which is equal to the time during which the relays A and B have been energized, can be removed or tapped-off in the arrangement of FIG. 3 by any suitable and therefore not particularly illustrated further work contacts of such relays.

Figure 4:
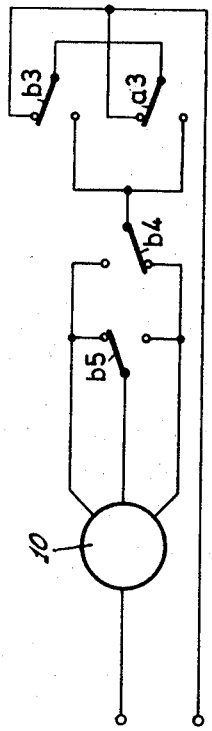
FIG. 4 is a circuit diagram of a servomotor serving to control a mixing valve of a heating installation.

These further work contacts however have been illustrated in the circuitry of FIG. 4 as switch-over contacts a3 and b3, representing a possible circuit for controlling a servomotor 10 corresponding to the servomotor 10 of FIG. 1. The servomotor 10 can be a direct-current or alternating-current motor. Depending upon whether the relay A or the relay B is energized this servomotor rotates in the clockwise or counterclockwise direction, wherein by means of the switch-over contacts b4 and b5 the field winding of the servomotor 42 can be switched. The switch-over contacts a3 and b3, corresponding to the pulse contacts, are switched in such a manner that when both are simultaneously located in the work position no current is conducted to the servomotor 10.

In order to generate pulses of the same length for controlling the servomotor 10 it is important that both relays A and B are equipped with an equal number of contacts. Thus there is preferably employed for actuation of the switch-over contacts b3, b4 and b5 a non-illustrated intermediate relay which is controlled by the relay B.

The voltage dividers illustrated in FIG. 3 exhibit, apart from the above-described components or elements, still a further respective resistor 43 and 44 connected in series with the NTC-resistors 12 and 31. These NTC-resistors serve to determine the outside temperature and since such in comparison to the temperature of the water at the start of the preliminary conduit 3 and especially with regard to the room temperature are subjected to large fluctuations their influence is limited by the series circuit of the resistors 43 and 44. Additionally, a further respective resistor 45 and 46 is connected in series with the parallel circuit of the NTC-resistors. By means of these resistors the voltage divider is rendered high-ohmic, so that the diode 30 is subjected to less load. Moreover, both of the charging resistors 23 and 24 have been represented as adjustable resistors so that a fine regulation of the control device is possible.

The above-described control device is capable of controlling a heating installation as well as also an air-conditioning installation in such a manner that only minimum temperature fluctuations arise in the rooms undergoing monitoring. Since there is not unnecessarily more heat than absolutely required the rooms are never overheated so that the economies of the heating installation are increased.

While there is shown and described present preferred embodiments of the invention, it is to be distinctly understood that the invention is not limited thereto but may be otherwise variously embodied and practiced within the scope of the following claims.

Accordingly what is claimed is:

1. A control device for a heating installation comprising mechanism for influencing the temperature of a heat carrier, said control device comprising an electrical circuit incorporating temperature-dependent resistors for respectively determining the outside temperature, the room temperature and the temperature of the heat carrier which is delivered to a room to be heated, said electrical circuitry embodying at least one voltage divider incorporating an adjustable resistor and said temperature-dependent resistors, said temperature-dependent resistors being connected in parallel to one another, two charging capacitors each provided with a respective charging resistor, one charging capacitor being connected with that partial voltage of the voltage divider which increases during increase of at least one of the aforementioned temperatures, the other charging capacitor being connected with that partial voltage of the voltage divider which increases during decrease of at least one of the aforementioned temperatures, a respective pulse generating device coupled with each charging capacitor for producing a pulse when the charging voltage has reached a predetermined value and the charging capacitor simultaneously discharges, said pulses serving to control said mechanism for influencing the temperature of the heat carrier.

2. The control device as defined in claim 1, wherein said electrical circuitry comprises a further voltage divider similar to the first mentioned voltage divider, a power source with which both said voltage dividers are electrically connected, said power source having a pair of terminals, said adjustable resistor of one voltage divider being connected with a first terminal of said power source, said adjustable resistor of the other voltage divider being connected with a second terminal of said power source, said charging capacitors being connected with the first terminal of said power source and via the associated charging resistor with a respective terminal point of the associated voltage divider.

3. The control device as defined in claim 1, wherein each of said pulse generating devices for generating pulses delivers a pulse of constant length and constant amplitude when the associated charging capacitor has charged to the predetermined charging voltage.

4. The control device as defined in claim 3, wherein each device for generatin pulses comprises a controllable cold cathod tube and a relay, the control path of the cold cathode tube being connected in parallel to the associated charging capacitor and said relay being arranged in the anode current circuit of the associated cold cathode tube.

5. The control device as defined in claim 4, further including an extinguishing capacitor connectable with the anode of the cold cathode tube and which simultaneously brings about a timedelay de-energization of the relay, and means for charging the extinguishing capacitor after the generation of a pulse.

6. The control device as defined in claim 5, wherein said means for charging the extinguishing capacitor comprises switch-over contact means of both relays, said switch-over contact means being coupled with one another such that the extinguishing capacitor is effective in a time sequence for both cold cathode tubes, and each relay possesses a work contact for discharging the associated charging capacitor when the relevant cold cathode tube has ignited.

* * * * *